Oct. 20, 1925.
P. E. TARLTON
LUBRICATING SYSTEM
Filed Oct. 10, 1922
1,558,313
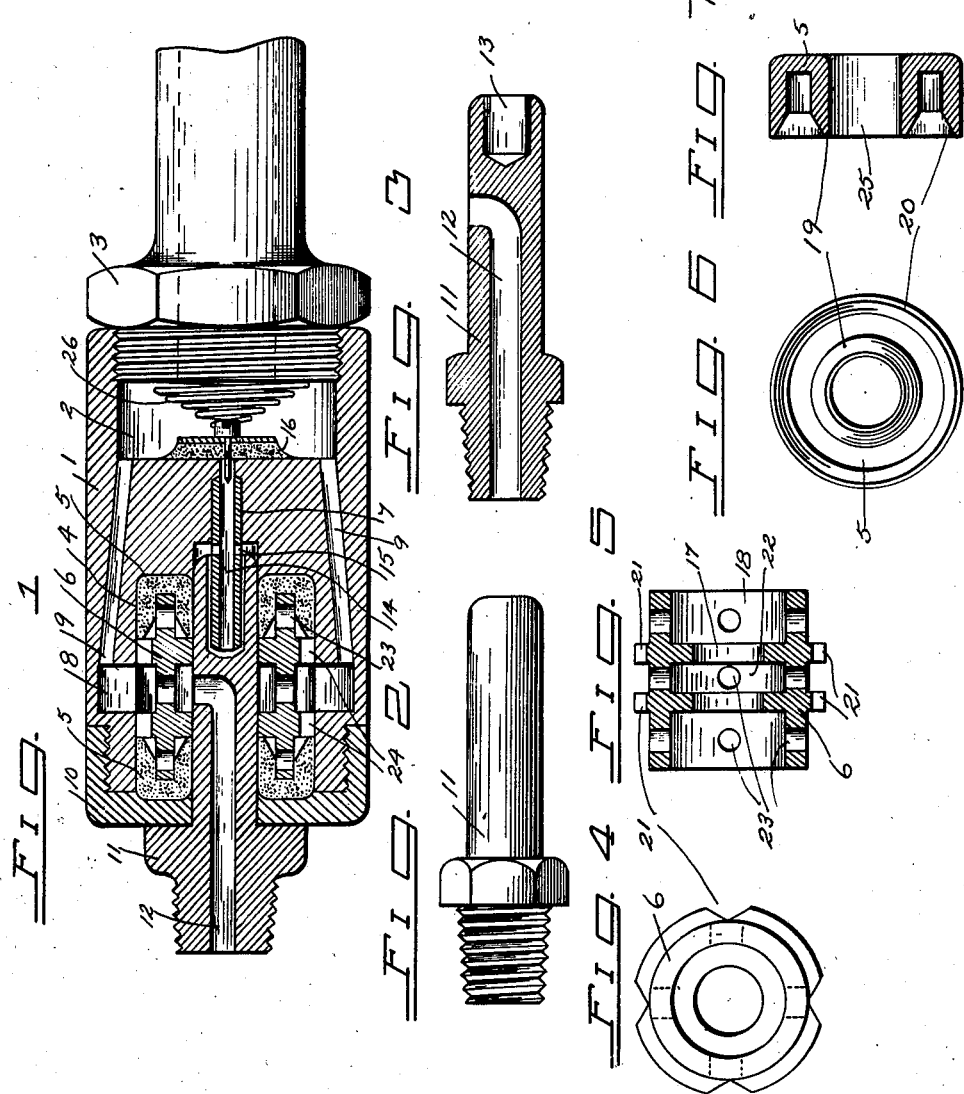
Inventor.
Perle E. Tarlton.
R. W. Smith
Attorney.

Patented Oct. 20, 1925.

1,558,313

UNITED STATES PATENT OFFICE.

PERLE E. TARLTON, OF LOS ANGELES, CALIFORNIA, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING SYSTEM.

Application filed October 10, 1922. Serial No. 593,527.

*To all whom it may concern:*

Be it known that I, PERLE E. TARLTON, a citizen of the United States, residing at Los Angeles, county of Los Angeles, State of California, have invented new and useful Improvements in Lubricating Systems, of which the following is a specification.

This invention relates to devices for forcing grease or other lubricant into bearings or other parts of machinery or vehicles.

One object of the invention is to provide a detachable interconnection between a lubricant injecting member and a lubricant receiving part, said interconnection including a leak-proof, self-tightening, and durable packing for the interengaging parts, so as to prevent discharge of lubricant in any but the desired direction.

Another object is to provide a nipple and cooperating nozzle as the interconnecting parts, said nozzle having a positive, dependable guide for the nipple as the parts are interengaged.

Another object is to provide means whereby air and grease within the bore of the nozzle will be forced back in the lubricant injecting member as the nipple enters the nozzle, thus permitting a full and free interengagement of the parts.

Further objects of the invention will be readily understood from the following description of the accompanying drawings, in which:

Fig. 1 is a longitudinal section through the device, showing the nipple inserted in the nozzle.

Fig. 2 is an elevation of the nipple.

Fig. 3 is a longitudinal section through the nipple.

Fig. 4 is a plan view of the packing spacing sleeve.

Fig. 5 is a longitudinal section of the same.

Fig. 6 is a plan view of one of the packing washers.

Fig. 7 is a longitudinal section of the washer.

The nozzle structure of the lubricating device consists of a body 1, in one end of which is a bore 2. A lubricant under pressure is adapted to be supplied to bore 2, and as an instance of this arrangement, said bore may be screw threaded to allow a hose end 3, or other suitable fitting, to be screwed therein. The hose may be connected to a usual grease gun or other lubricant supplying means.

A bore 4 in the opposite end of body 1, forms a chamber adapted to receive packing washers 5 and a spacing sleeve 6. A cap 10 having an axial bore is threaded onto the end of the nozzle body for retaining the washers and sleeve in position.

The bore 4 is provided with an annular recess 8, and one or more longitudinal conduits 9 in the nozzle body, communicate at their respective ends with the recess 8 and the bore 2. The lubricant under pressure which is supplied to bore 2 will thus be forced through conduits 9 into the annular recess 8.

A nipple 11 is adapted for detachable interengagement with the nozzle, said nipple being fixed to a bearing or other part which it is desired to lubricate. In the present instance the nipple is shown as threaded at one end in order that it may be screwed into, or otherwise fixed to a bearing.

The opposite end of the nipple is a smooth cylindrical structure which is adapted to have the nozzle received thereover. The nipple is provided with a bore 12 for the passage of lubricant, said bore extending longitudinally inwardly from the threaded end of the nipple and thence transversely through the wall of the nipple.

The spacing sleeve 6 which is received in chamber 4, is provided with exterior annular flanges 21, spaced apart, and of a diameter to snugly fit within bore 4, and thereby space the sleeve from the wall of the bore. The spacing sleeve has a bore 17 of slightly greater diameter than that of nipple 11, and adapted to receive said nipple. The ends of the sleeve are counterbored as shown at 18, to a substantially greater diameter than that of nipple 11, so that annular spaces will be formed around the nipple at said counterbores.

The bore 17 is provided with an annular recess 22, and the parts are so arranged that said recess is opposite the space between annular flanges 21 and the recess 8, and the open transverse end of the nipple bore is also opposite the recess 22.

The packing washers 5 are received over the respective ends of sleeve 6, said washers being of a suitable flexible, yielding material, such as leather. Each washer, as shown in Figs. 6 and 7, is an annular member, cup or U-shaped in cross section, and forming an annular base with radially spaced upstanding inner and outer flanges 19 and 20. The washers are adapted to fit loosely over the ends of sleeve 6, with the inner diameters 25 of the washers fitting snugly over nipple 11. The flanges 19 of the washers are thus received in the annular spaces formed by counterbores 18, and flanges 20 of the washers are positioned in the annular spaces between the wall of bore 4 and the sleeve 6.

Sleeve 6 is perforated opposite recess 22 and at the ends of the sleeve, as shown at 23, and the annular flanges 21 are notched as shown at 24. Lubricant under pressure in recess 8 will thus flow to all parts of the spacing sleeve through said perforations and notches, and the lubricant thus supplied to the annular recess 22 surrounding the nipple 11, will be forced into the bore of the nipple and thence into the bearing or other part to be lubricated.

Part of the lubricant from recess 8 will be forced through notches 24 and the perforations 23 in the ends of sleeve 6, so as to expand the flanges 20 of the washers tightly against the wall of chamber 4, and force the flanges 19 of the washers against the nipple 11. A self-tightening packing is thus provided at each end of nipple 11, beyond the transverse open end of its bore, and as a consequence the lubricant is prevented from leaking down the outside of nipple 11, and will be forced through the bore thereof.

A centrally disposed guide pin 7 is mounted in the nozzle body 1 and extends into the chamber 4. The end of nipple 11 is provided with a blind bore 13, and the parts are so arranged that when the nipple is inserted in the nozzle, the guide pin will enter the bore 13 and thereby guide the nipple centrally through the packing washers 5, and thus prevent the end of the nipple from catching upon and distorting the thin edge of flange 19 of the inner washer.

The guide pin 7 has a bore 14 extending longitudinally therethrough and communicating at its respective ends with bore 2 and the chamber 4, and the end of said bore communicating with chamber 2 is normally closed by a valve 16 which is seated by a spring 26. A transverse bore 15 extends through the wall of the guide pin and communicates with the bore 14 and the inner end of chamber 4.

By this arrangement, as nipple 11 enters the nozzle, any accumulation of air and grease therein will be forced through guide pin 7 by way of the bores 14 and 15, thereby opening valve 16 and returning said accumulation to the chamber 2. When the nipple is fully inserted, spring 26 closes the valve 16 over the bore 14, thereby preventing any grease under pressure from entering over the end of the nipple and tending to force the same out of the nozzle.

While I have illustrated and described the invention in connection with a lubricating system, it will be apparent that it is applicable as an injecting means for any fluid.

I claim as my invention:

1. The combination with a fitting of a nozzle for receiving said fitting, having a bore and a passageway communicating with said bore intermediate its ends, means adjacent each end of said bore for making sealing contact with said fitting, said nozzle including a passageway for venting the inner end of said bore, and an inwardly opening check valve closing one end of said last named passageway.

2. The combination with a nozzle having a bore, of a spacing sleeve in said bore, an annular packing member U-shaped in cross section, positioned over the end of said sleeve and between the respective faces of the sleeve and the wall of the nozzle bore, the bore of said sleeve being of substantially the same diameter as the opening through said packing member, and a nipple in said sleeve and guided in said nozzle by the wall of the bore of said sleeve, said spacing sleeve having transversely extending openings extending between the sides of the U-shaped packing member.

3. The combination with a nozzle having a bore and packing means in said bore, of a nipple insertable in said bore and through said packing means, said nozzle having means extending through said packing means for engaging said nipple and guiding it into said packing means.

4. The combination of a nozzle having a bore, of packing means in said bore, and a nipple insertable in said bore through said packing means, said packing means comprising a longitudinally extending flange for expanding within the bore of said nozzle and contracting around said nipple, said nozzle having means extending through said packing means for guiding said nipple into said flange of the packing means.

5. The combination with a nozzle having a bore, of a nipple insertable in said bore, means for effecting sealed connections between said nozzle and nipple at two longitudinally separated points on said nipple, said nozzle and nipple having registering openings between said points for the transfer of lubricant and means for venting the inner end of said bore.

In testimony whereof I have signed my name to this specification.

PERLE E. TARLTON.